Feb. 4, 1930.  R. HUGERSHOFF  1,745,897
AEROCARTOGRAPH
Filed April 12, 1929
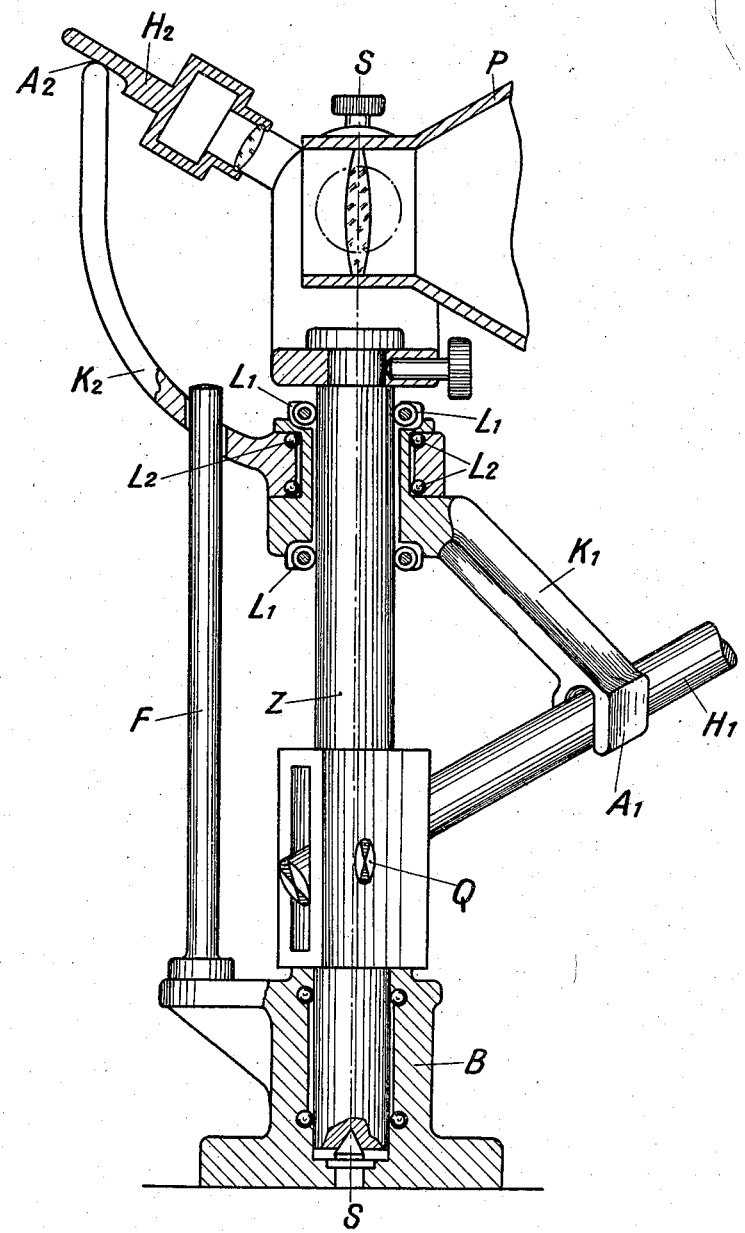
Inventor:
R. Hugershoff Patented Feb. 4, 1930

1,745,897

UNITED STATES PATENT OFFICE

REINHARD HUGERSHOFF, OF DRESDEN, GERMANY, ASSIGNOR TO "IKARUS" INTER-NATIONALE PATENTVERWERTUNGS A.-G., OF VADUZ IM FURSTENTUM, LIECHTEN-STEIN

AEROCARTOGRAPH

Application filed April 12, 1929, Serial No. 354,614, and in Germany September 7, 1928.

As is well known, in aerocartographs, that is to say instruments for plotting stereophotogrammetric pictures, the motion of space-guides is transmitted to the measuring device, that is to say to the picture carriers on the one hand and to the inlet reflectors on the other hand, by an intermediate body being interposed between the guide and the moving member of the measuring device, such that it can be displaced along an axis and is provided with extensions, the points of application of which on the guide on the one hand and on the moving member on the other hand are equidistant from the said axis, one extension being in the form of a circular ring or a section of a circular ring at right angles to the said axis.

In an arrangement of this kind there will be friction both at the spindle embodying the sliding axis, along which there is sliding motion, and at the circular ring, on the amount of which depends the accuracy of the directional transmission. In this known arrangement, for reducing the friction it is not possible simply to use ball bearings, such as are ordinarily used for such a purpose, as both at the sliding spindle and at the circular ring two motions take place at right angles to one another, namely a rotary and a sliding motion.

This disadvantage as regards the accuracy in the directional transmission is overcome in accordance with the present invention, by the intermediate body being divided into two parts which are capable of rotating with respect to one another, each one of which carries one of the extensions referred to above. The circular ring or section of a circular ring is however so constructed that it is carried round by the space-guide which rotates the sliding spindle, so that this part of the intermediate body no longer performs a rotary motion relative to the sliding spindle, but only a sliding motion. The other part of the intermediate body on the other hand does not perform a sliding motion relative to the first part, but only a rotary motion. Consequently it is possible to provide two ball bearings, such that one of them has only a sliding motion and the other only a rotary motion.

In the accompanying drawing a constructional example of the invention is shown partly in elevation and partly in section.

On the cylindrical spindle Z embodying the axis S—S there slides the intermediate body consisting of the parts $K_1$ and $K_2$ and having the points of application $A_1$ and $A_2$ for the guide $H_1$ and the movable $H_2$ of the picture carrier P. Both points of application are equidistant from the sliding axis S—S. The cylindrical spindle Z is mounted so as to be rotatable in the socket B fixed to the base and at the top supports the picture carrier P. The guide $H_1$ is connected by the horizontal pivot Q to the cylindrical spindle Z. Each horizontal rotary motion of the guide $H_1$ is transmitted to the spindle Z and consequently to the picture carrier P. The lower part $K_1$ of the intermediate body takes part in the same rotary motion, so that it performs no rotary motion whatever relative to the spindle Z, but rotates relatively to the upper part $K_2$ which is held in position by the guide F. The friction due to the relative rotary motion of the parts $K_1$ and $K_2$ is reduced by the ball bearing $L_2$. In this tilting motion of the guide $H_1$ the parts $K_1$ and $K_2$ of the intermediate body slide along the spindle Z in such a manner that the moving member $H_2$ tilts through the same angle as the guide $H_1$. The friction due to the purely sliding motion between the part $K_1$ and the spindle Z is reduced by the ball bearing $L_1$.

What I claim is:

1. An instrument for plotting measuring photographs, comprising a lever ($H_2$), a space-guide ($H_1$), a spindle capable of being rotated by the space-guide, an intermediate body between the lever ($H_2$) and the space-guide ($H_1$) mounted on the said spindle in such a manner as to be capable of sliding thereon, the said body comprising two parts ($K_1$, $K_2$) capable of rotating relative to one another, of which the part ($K_2$) is co-operatively associated with the lever ($H_2$) and the other part ($K_1$) with the space-guide ($H_1$) and means (F) which prevent the rotation of the part ($K_2$) relative to the spindle, as and for the purpose set forth.

2. An instrument for plotting measuring photographs, comprising a lever ($H_2$), a space-guide ($H_1$), a spindle capable of being rotated by the space-guide, an intermediate body between the lever ($H_2$) and the space-guide ($H_1$) mounted on the said spindle in such a manner as to be capable of sliding thereon, the said body comprising two parts ($K_1$, $K_2$) capable of rotating relative to one another, of which the part ($K_2$) is co-operatively associated with the lever ($H_2$) and the other part ($K_1$) with the space-guide ($H_1$), means (F) which prevent the rotation of the part ($K_2$) relative to the spindle, ball bearings ($L_1$) between the part ($K_1$) and the spindle and ball bearings ($L_2$) between the part ($K_1$) and the part ($K_2$), as and for the purpose set forth.

In testimony whereof I have signed my name to this specification.

REINHARD HUGERSHOFF.